United States Patent
Kho

(10) Patent No.: US 10,643,410 B2
(45) Date of Patent: May 5, 2020

(54) BULK RIVET CONTAINER AND TRANSFER CABINET

(71) Applicant: Newfrey LLC, New Britain, CT (US)

(72) Inventor: Chuan Meng Kho, Troy, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 16/051,103

(22) Filed: Jul. 31, 2018

(65) Prior Publication Data
US 2020/0043264 A1    Feb. 6, 2020

(51) Int. Cl.
 G07C 9/00    (2020.01)
 B21J 15/32    (2006.01)
 B23P 19/00   (2006.01)

(52) U.S. Cl.
 CPC .......... G07C 9/00309 (2013.01); B21J 15/32 (2013.01); B23P 19/001 (2013.01)

(58) Field of Classification Search
 CPC ..... A61J 2205/10; B21J 15/32; B23P 19/001; G07C 9/00309
 See application file for complete search history.

(56) References Cited

U.S. PATENT DOCUMENTS

| | | | | |
|---|---|---|---|---|
| 3,534,896 A | * | 10/1970 | Krynytzky | B21J 15/14 227/111 |
| 3,633,791 A | * | 1/1972 | Kelly | B21J 15/32 221/167 |
| 3,823,844 A | * | 7/1974 | Linkemer | A61J 7/02 221/13 |
| 4,044,462 A | * | 8/1977 | Anselmo | B21J 15/32 29/809 |
| 4,592,136 A | * | 6/1986 | Hirsch | B21J 15/32 221/167 |

(Continued)

FOREIGN PATENT DOCUMENTS

| | | |
|---|---|---|
| EP | 0528189 A1 | 2/1993 |
| EP | 1102650 B1 | 3/2003 |

(Continued)

OTHER PUBLICATIONS

Extended European Search Report in counterpart European Patent Application No. 19187976.6 dated Jan. 9, 2020.

*Primary Examiner* — Gene O Crawford
*Assistant Examiner* — Kelvin L Randall, Jr.
(74) *Attorney, Agent, or Firm* — Harness, Dickey & Pierce, P.L.C.

(57) ABSTRACT

A bulk rivet container can include a cover and an adjacent RFID tag, and the cover can be moveable between a closed position and an open position. A cover exterior can have an opening recess. A peripheral side of the container can include an orienting protrusion and a container locking recess. The container can be designed to cooperate with a transfer cabinet having a rivet entry passage closable by a cabinet cover to which an RFID reader is coupled. The cabinet can have a locking protrusion and an opening protrusion oriented about the cabinet entry passage. The orienting protrusion, the container locking recess, and the container opening recess can be designed to be simultaneously couplable with the orienting recess, the container locking protrusion, and the container opening protrusion, respectively, while the RFID tag is simultaneously readable by the RFID reader.

20 Claims, 13 Drawing Sheets

(56) References Cited

U.S. PATENT DOCUMENTS

| | | | |
|---|---|---|---|
| 4,830,547 A * | 5/1989 | Boob | B21J 15/32 221/233 |
| 5,465,868 A | 11/1995 | Bonomi | |
| 5,646,912 A * | 7/1997 | Cousin | A61J 7/0481 368/10 |
| 6,276,563 B1 | 8/2001 | Saldana et al. | |
| 6,497,339 B1 * | 12/2002 | Geltser | A61J 7/02 198/766 |
| 6,688,489 B2 | 2/2004 | Bloch et al. | |
| 6,692,213 B1 | 2/2004 | Butler | |
| 6,944,944 B1 | 9/2005 | Craythorn et al. | |
| 6,959,835 B2 | 11/2005 | Bloch et al. | |
| 7,040,506 B2 | 5/2006 | Bloch et al. | |
| 8,805,575 B1 | 8/2014 | Bloch et al. | |
| 9,037,291 B2 * | 5/2015 | Terzini | A61J 7/02 700/236 |
| 9,937,623 B2 | 4/2018 | Vasquez et al. | |
| 2002/0070227 A1 * | 6/2002 | Ferruccio | A61J 7/0084 221/15 |
| 2003/0183642 A1 * | 10/2003 | Kempker, Sr. | A61J 7/0084 221/2 |
| 2005/0284910 A1 | 12/2005 | Craythorn et al. | |
| 2016/0180624 A1 | 6/2016 | Hain et al. | |
| 2017/0072521 A1 | 3/2017 | Munstermann et al. | |
| 2017/0080479 A1 | 3/2017 | Honsel | |

FOREIGN PATENT DOCUMENTS

| | | |
|---|---|---|
| EP | 1297917 B1 | 2/2007 |
| EP | 3034194 A1 | 6/2016 |
| WO | WO-2000/007751 A1 | 2/2000 |
| WO | WO-2011/029817 A2 | 3/2011 |
| WO | WO-2017/194749 A1 | 11/2017 |
| WO | WO-2017/194760 A1 | 11/2017 |

* cited by examiner

BULK RIVET CONTAINER AND TRANSFER CABINET

FIELD

The present disclosure relates to bulk rivet containers designed for use with a transfer cabinet.

BACKGROUND

This section provides background information related to the present disclosure which is not necessarily prior art.

Manufacturing lines can include rivets, such as self-piercing rivets, to fasten or join components together. A transfer cabinet can minimize potential downtime of riveting machines setting such rivets by helping insure rivets are always being fed to the riveting machine. The transfer cabinet can receive the bulk (i.e., loose) rivets from a container and feed the rivets sequentially (i.e., one after another) to a rivet feeder, such as a pneumatic feeder, of the riveting machine.

It is important to insure that the rivets being fed to the riveting machine at a particular riveting station along a manufacturing line are the correct rivets for that particular riveting station or riveting machine. Self-piercing rivets, for example, can be made of different materials, made by different processes (e.g., heat treatments), or have different coatings thereon. In many cases, it is difficult to distinguish different self-piercing rivets from each other. Thus, it is desirable to have a system to help insure that only the correct rivets are received by a transfer cabinet for a particular riveting station or riveting machine, and that the rivets are genuine. Reliance upon a single feature or aspect of the container, such as a RFID tag or poke a yoke coupling, can be helpful, but it is desirable to include multiple features or aspects to help minimize the possibility of an inadvertent or intentional feeding of incorrect or non-genuine rivets into a transfer cabinet for a particular riveting machine.

SUMMARY

This section provides a general summary of the disclosure, and is not a comprehensive disclosure of its full scope or all of its features.

In one aspect of the present disclosure a bulk rivet container can be designed to cooperate with a transfer cabinet having a cabinet entry passage closable by a cabinet cover to which an RFID reader is coupled and the transfer cabinet having a locking protrusion and an opening protrusion oriented about the cabinet entry passage relative to an orienting recess. The bulk rivet container can include a container discharge passage through which bulk rivets are dischargeable from the container. A container cover can be moveable between a closed container position in which the container cover closes the container discharge passage, and an open container position in which the container cover opens the container discharge passage. An orienting protrusion can be provided along a peripheral side of the container adjacent the discharge passage. A container locking recess can be provided along the peripheral side of the container adjacent the container discharge passage. A container opening recess can be along an exterior of the container cover. An RFID tag can be adjacent the container cover. The orienting protrusion, the container locking recess, and the container opening recess can be designed to be simultaneously couplable with the orienting recess, the container locking protrusion, and the container opening protrusion, respectively, and the positioning of the RFID tag can be designed to make the RFID tag simultaneously readable by the RFID reader.

In another aspect of the present disclosure a bulk rivet container and transfer cabinet combination can be provided. The transfer cabinet of the combination can include a cabinet entry passage through which bulk rivets are receivable into the cabinet from the container. The transfer cabinet can include a container mounting receptacle positioned over the cabinet entry passage and including a container orienting recess in a periphery thereof. The transfer cabinet can include a cabinet cover movable between a closed cabinet position in which the cabinet cover closes the cabinet entry passage and an open cabinet position in which the cabinet cover opens the cabinet entry passage. An exterior of the cabinet cover can have a container opening protrusion. The transfer cabinet can include a container locking protrusion adjacent the container mounting receptacle and movable between an unlocked position and a locked position. The transfer cabinet can include an RFID reader coupled to the cabinet cover. The bulk rivet container of the combination can include a container discharge passage through which bulk rivets are dischargeable from the container into the cabinet. The bulk rivet container can include a container cover moveable between a closed container position in which the container cover closes the container discharge passage, and an open container position in which the container cover opens the container discharge passage. The bulk rivet container can include a container orienting protrusion along a peripheral side of the container adjacent the container discharge passage. The bulk rivet container can include a container locking recess along the peripheral side of the container adjacent the container discharge passage. The bulk rivet container can include a container opening recess along an exterior of the container cover. The bulk rivet container can include an RFID tag adjacent the container cover. When the container is mounted to the container mounting receptacle of the cabinet, the RFID tag is positioned to be readable by the RFID reader, the container orienting protrusion is engaged with the container orienting recess, the container locking protrusion is movable between the unlocked position in which the container locking protrusion is outside the container locking recess and the locked position in which the container locking recess is engaged with the container locking recess, and the container opening protrusion is engaged with the container opening recess enabling the container cover to move from the closed container position to the open container position as the cabinet cover moves from the closed cabinet position to the open cabinet position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
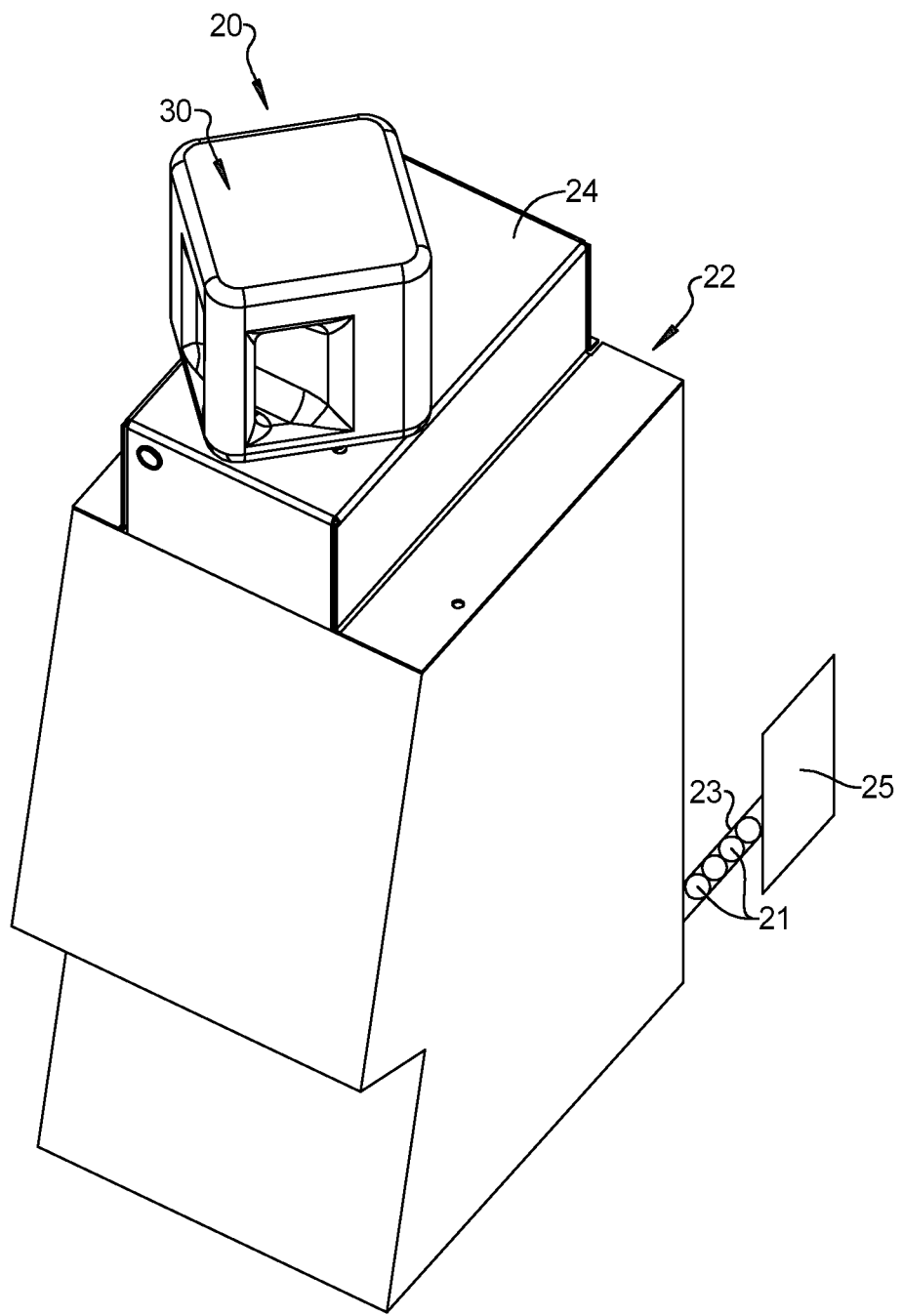
FIG. 1 is a perspective view of an exemplary bulk rivet container and transfer cabinet combination in accordance with the present disclosure.
Figure 2:
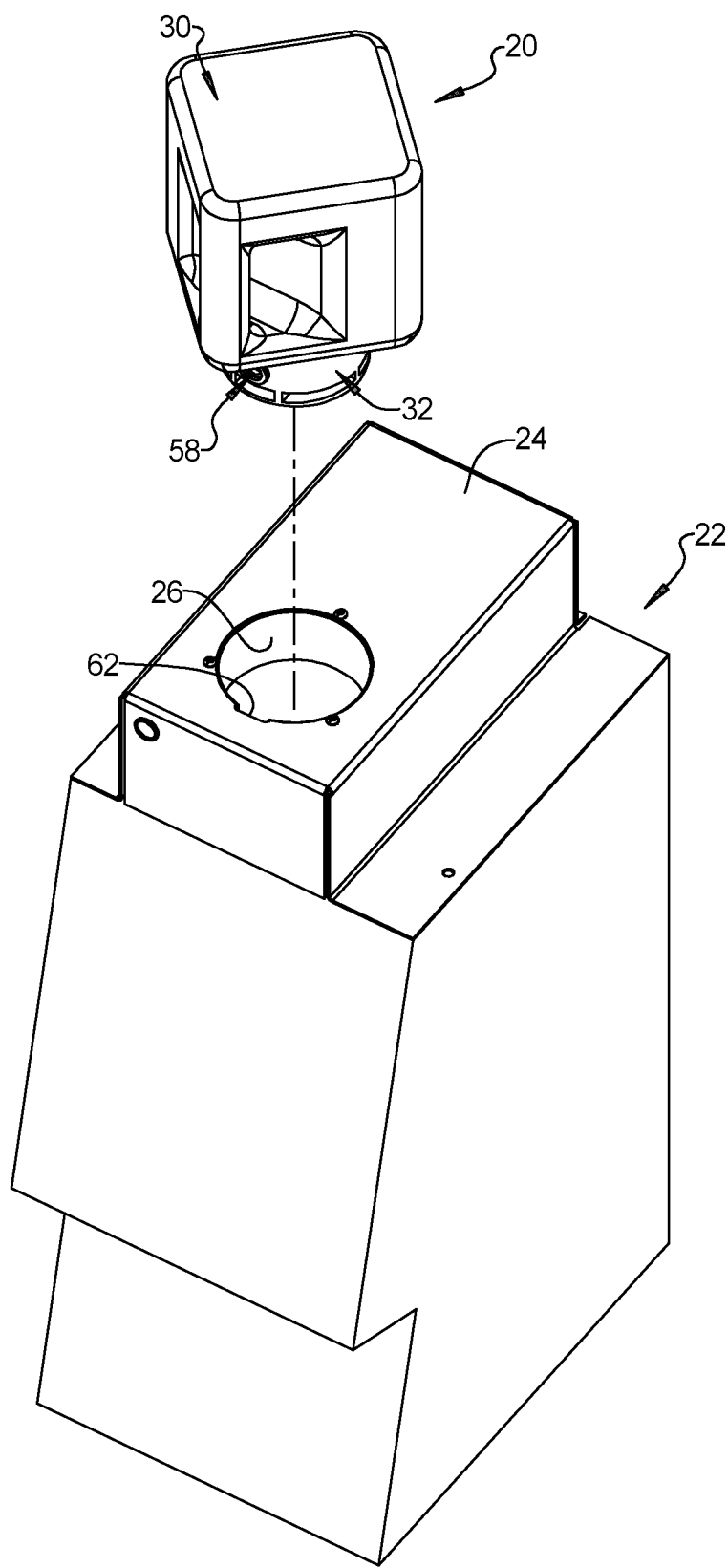
FIG. 2 is an exploded perspective view of the bulk rivet container and transfer cabinet example of FIG. 1.
Figure 3:
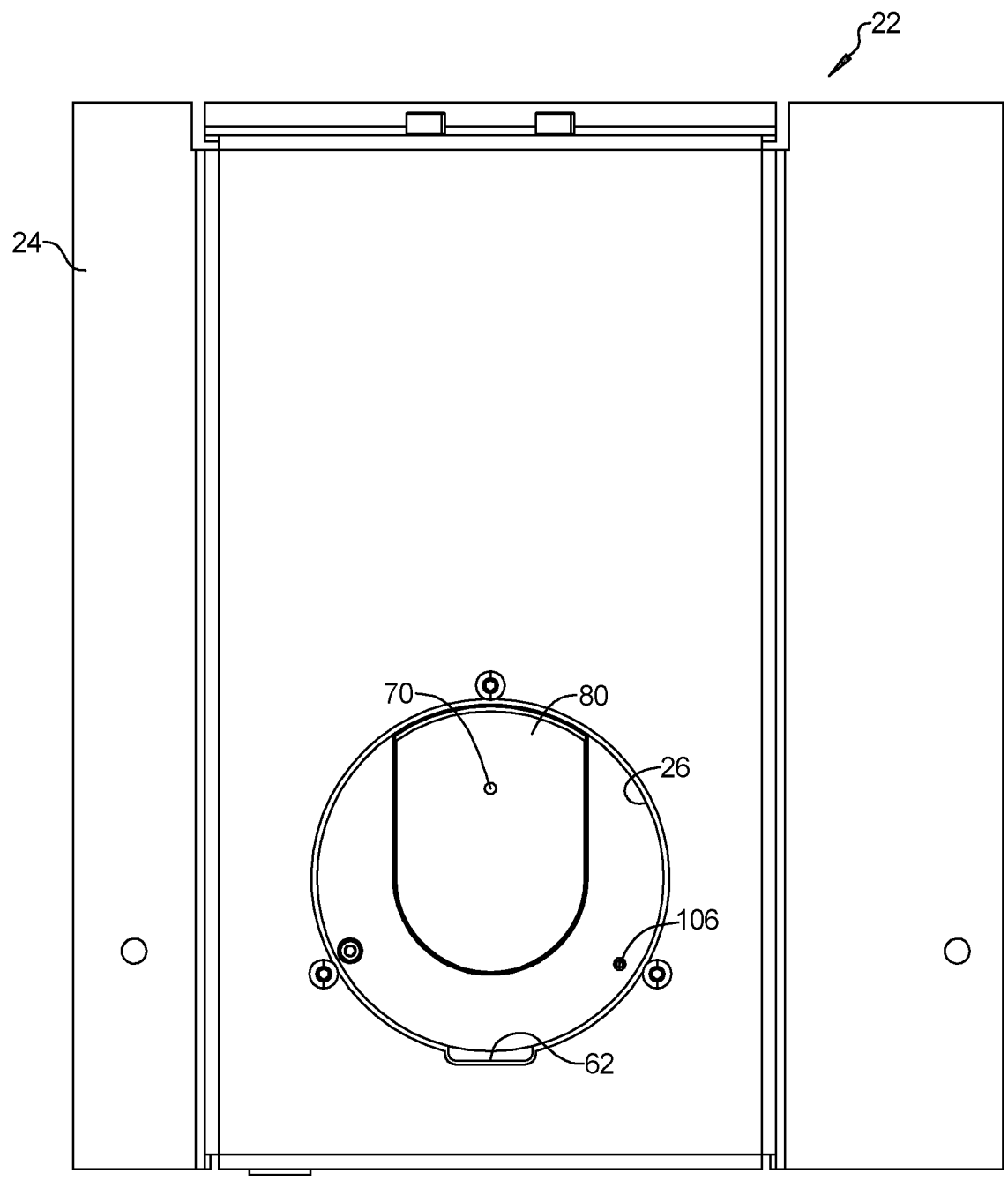
FIG. 3 is a top plan view of the transfer cabinet example of FIG. 1.
Figure 4:
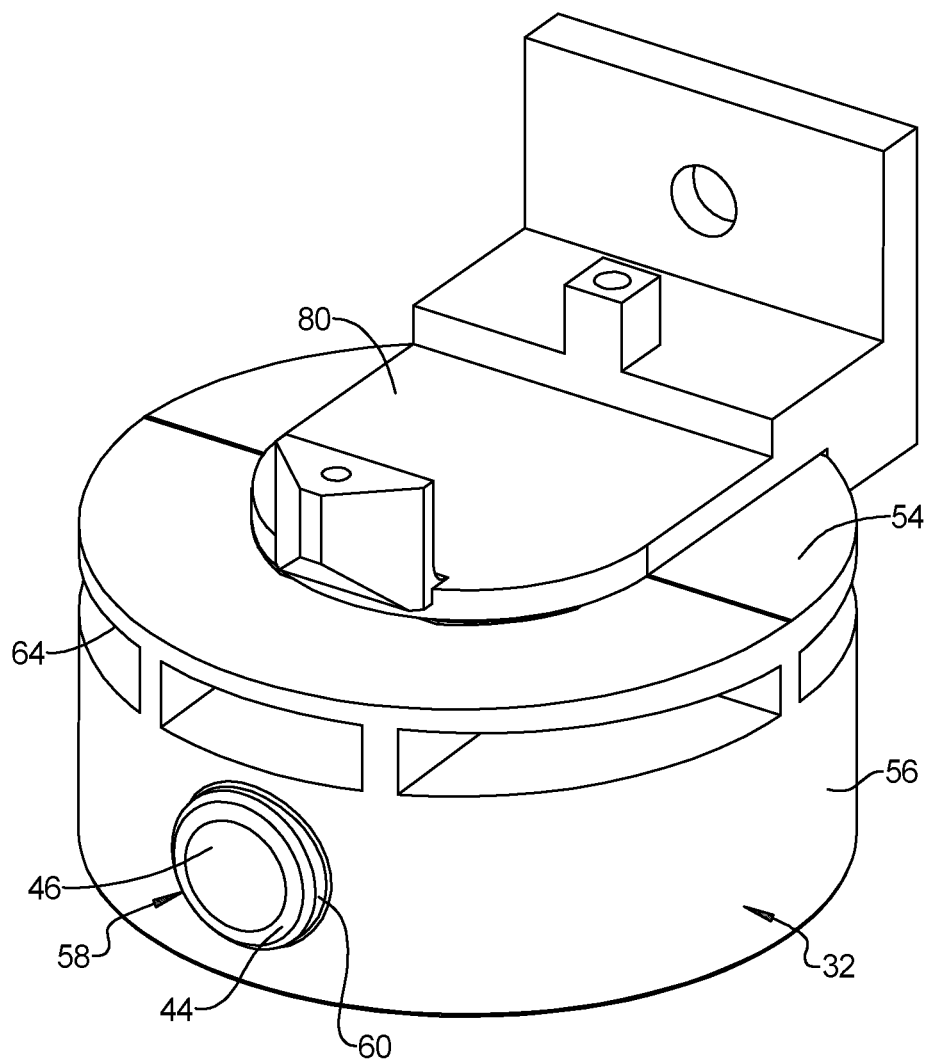
FIG. 4 is a perspective view of the cap of the bulk rivet container and the cabinet cover of the transfer cabinet example of FIG. 1.
Figure 5:
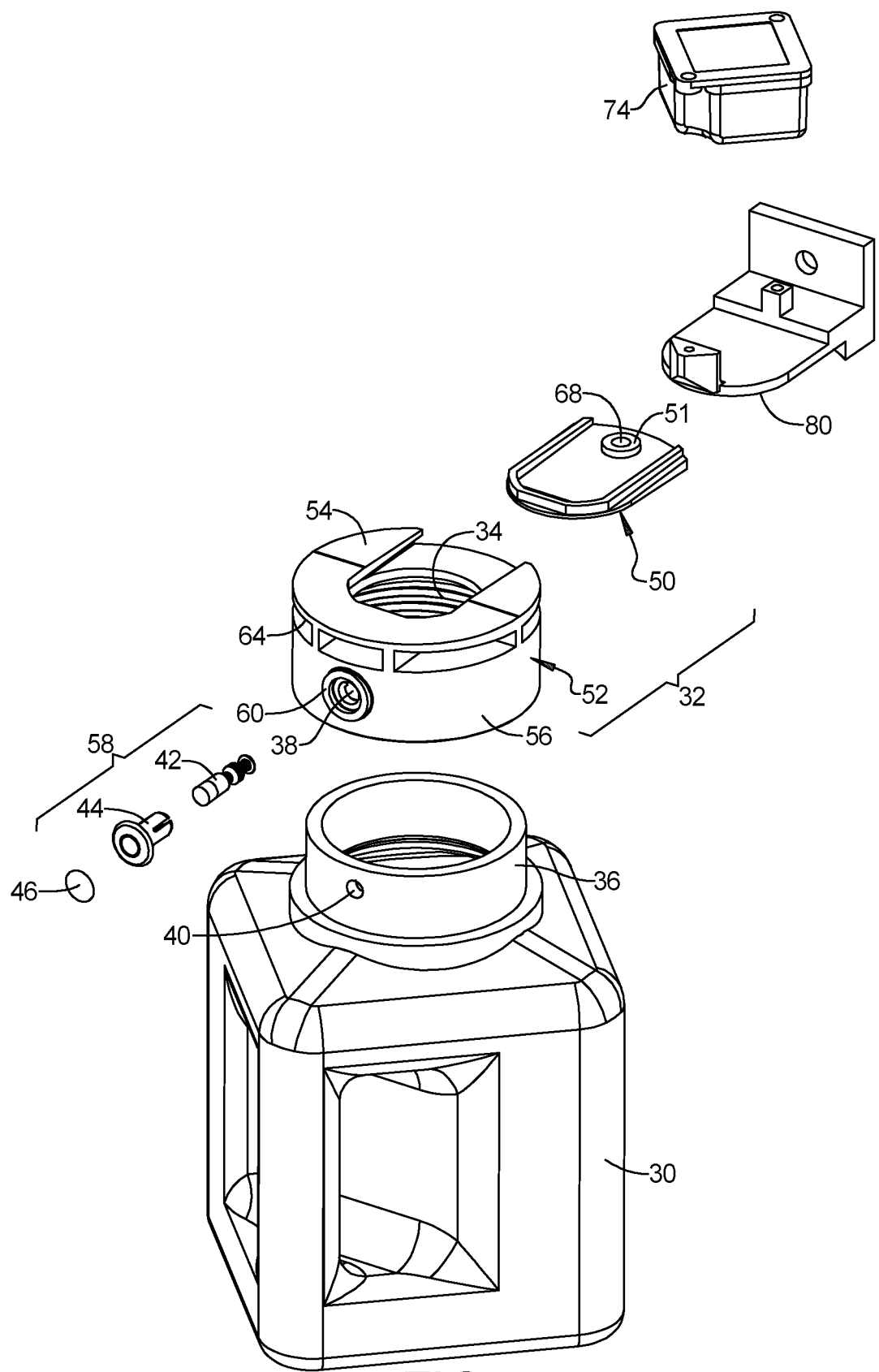
FIG. 5 is an exploded perspective view of the bulk rivet container example of FIG. 1.
Figure 6:
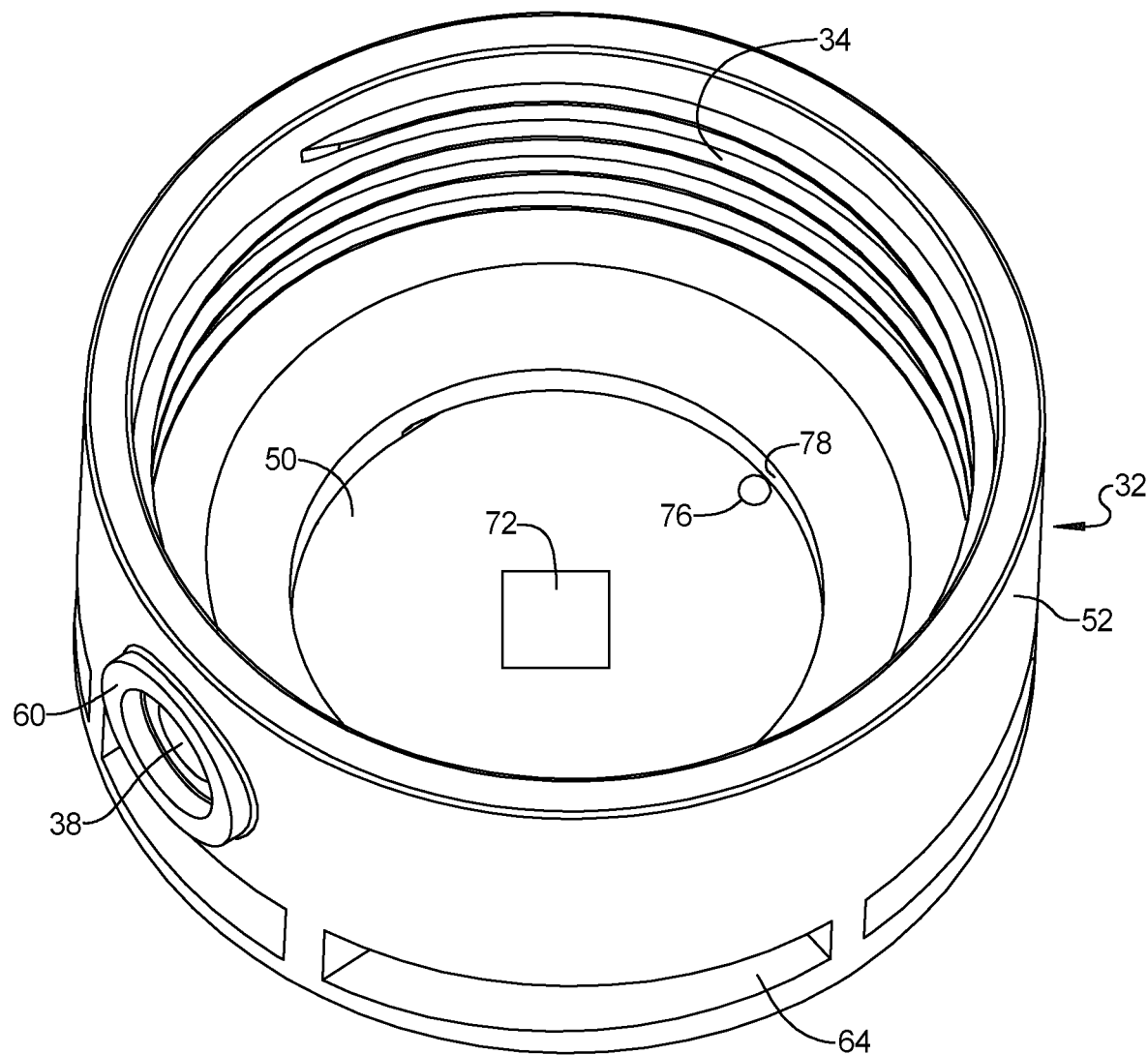
FIG. 6 is a perspective view of the cap of the bulk rivet container example of FIG. 1.
Figure 7:
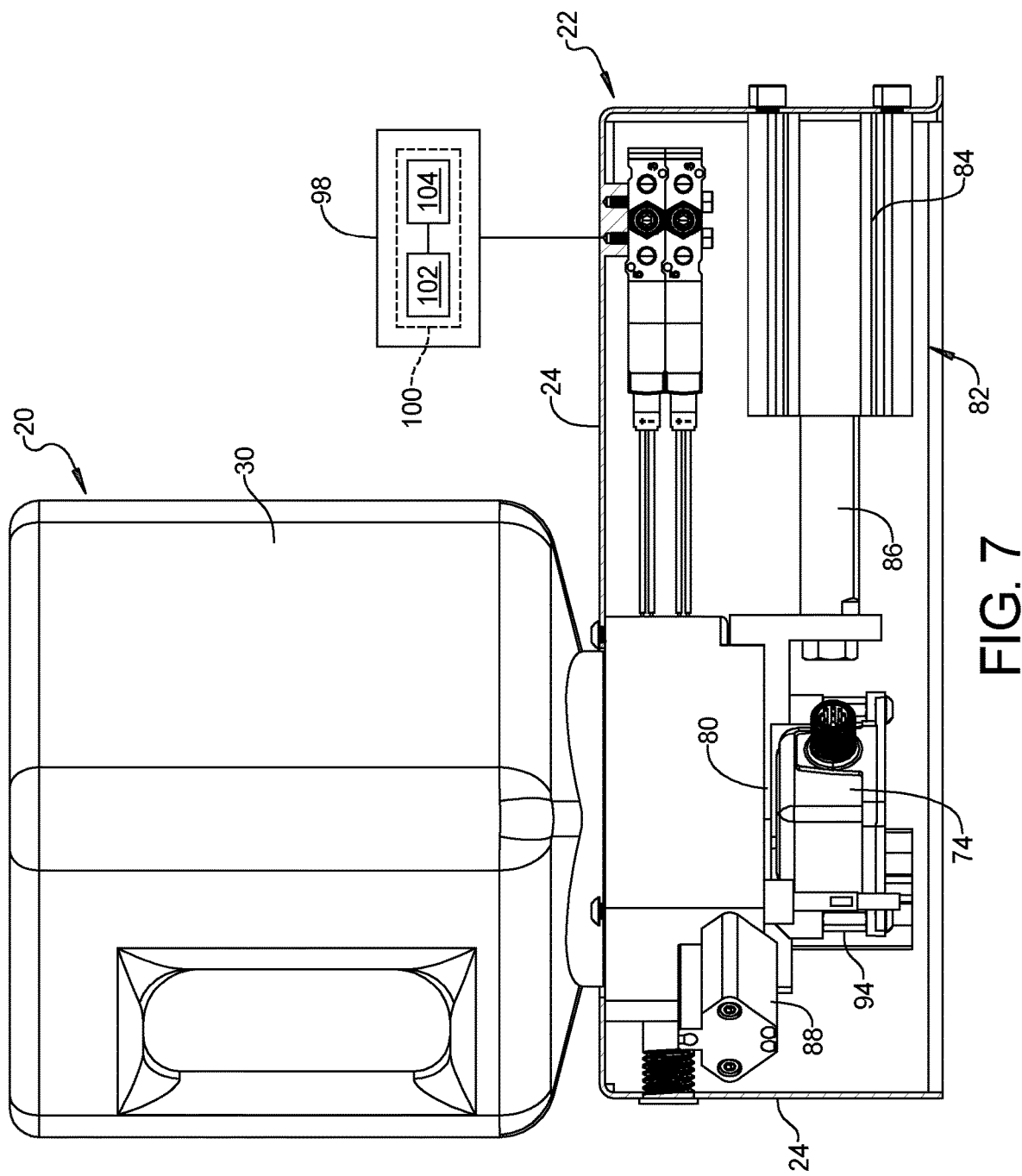
FIG. 7 is a cross-section of the bulk rivet container example of FIG. 1 and part of the transfer cabinet example of FIG. 1 with the actuator, container cover, and cabinet cover in respective closed positions.
Figure 8:
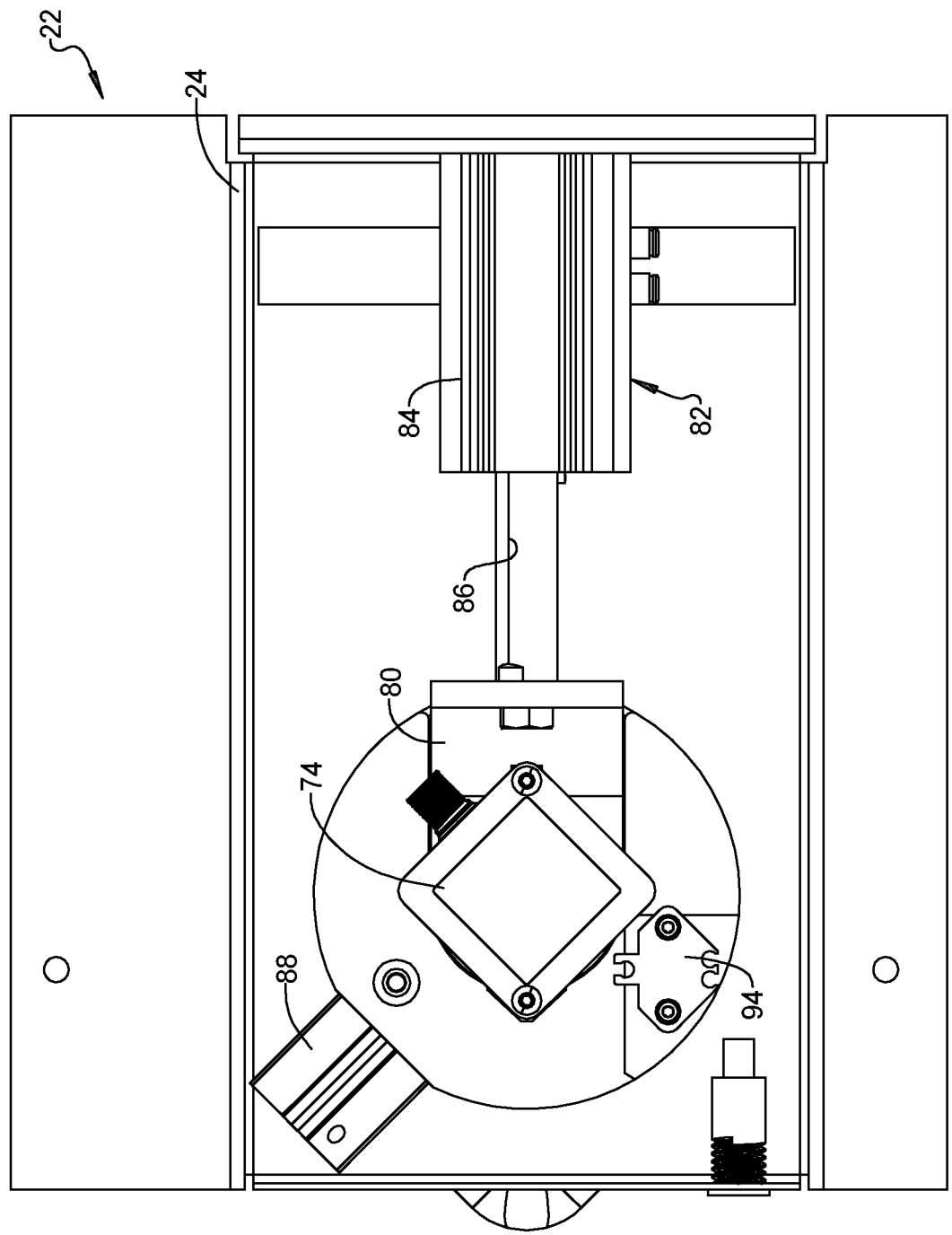
FIG. 8 is a bottom plan view of the cabinet housing including the container receptacle of the transfer cabinet example of FIG. 1.
Figure 9:
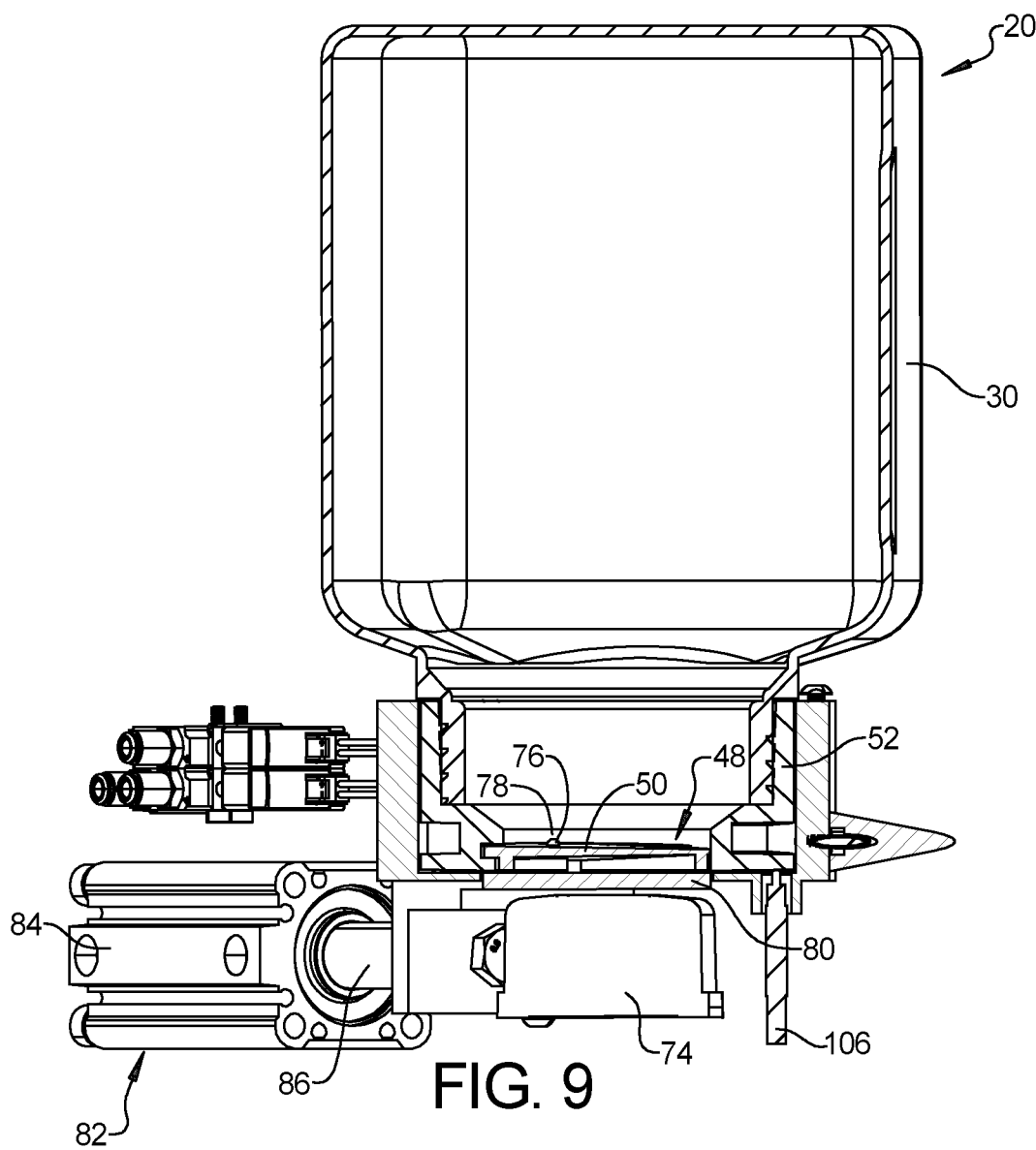
FIG. 9 is a cross-section view of the bulk rivet container example of FIG. 1 and part of the transfer cabinet example of FIG. 1 showing the container presence sensor of the transfer cabinet example of FIG. 1 in a present position engaged against the bulk rivet container example of FIG. 1.
Figure 10:
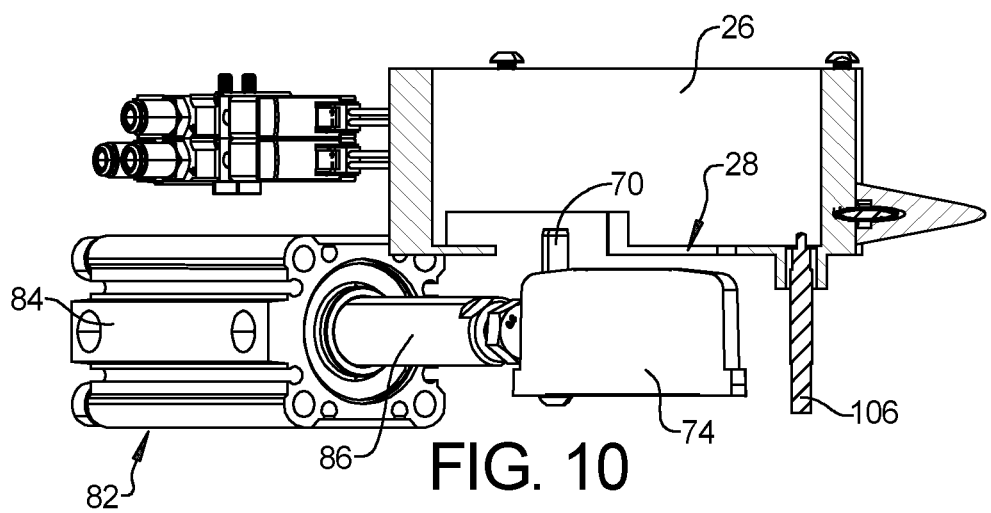
FIG. 10 is a cross-section view showing the container presence sensor of the transfer cabinet example of FIG. 1 in a non-present position.
Figure 11:
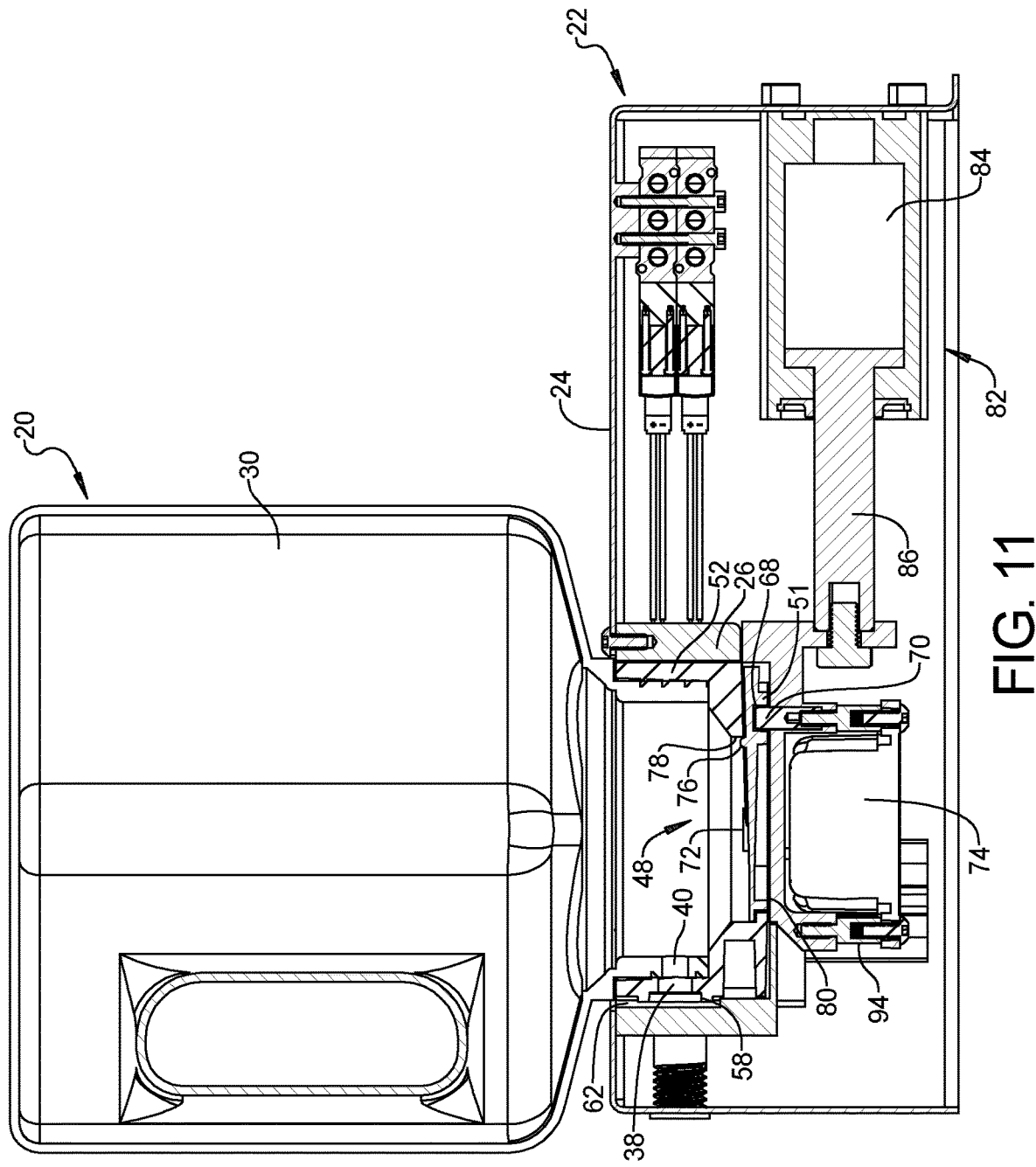
FIG. 11 is a cross-section view showing the container opening protrusion of the transfer cabinet example of FIG. 1 engaged with the container opening recess of the bulk rivet container example of FIG. 1.
Figure 12:
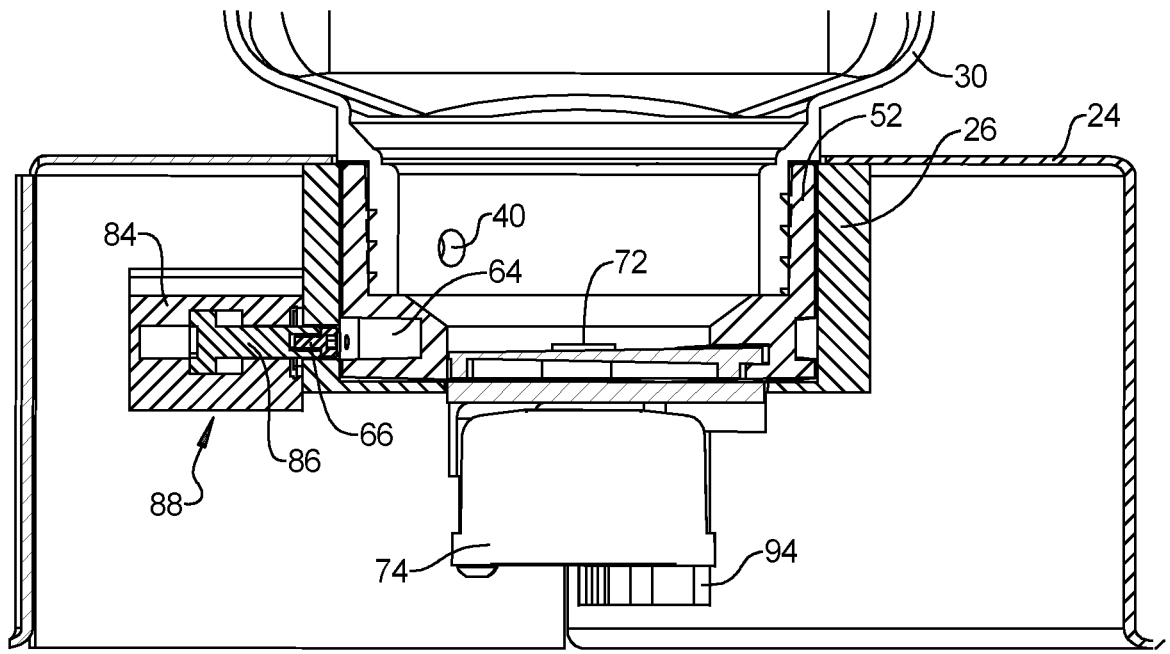
FIG. 12 is a cross-section view showing the container lock protrusion of the transfer cabinet example of FIG. 1 in an unlocked position relative to the container lock recess of the container example of FIG. 1.
Figure 13:
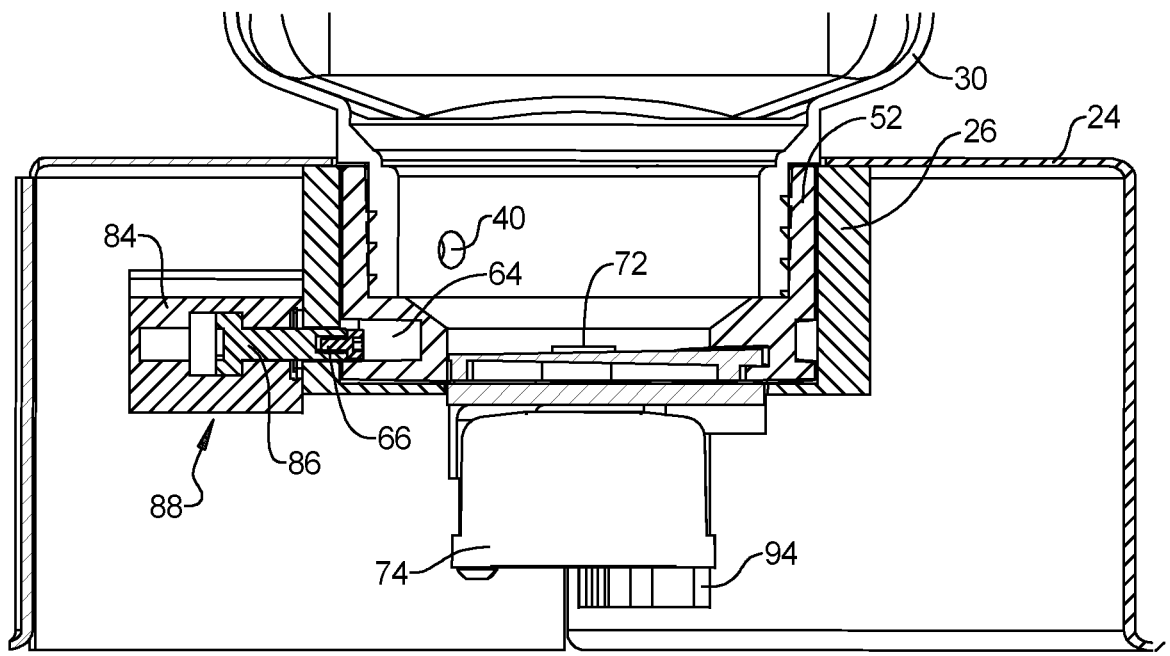
FIG. 13 is a cross-section view showing the container lock protrusion of the transfer cabinet example of FIG. 1 in a locked position relative to the container lock recess of the container example of FIG. 1.
Figure 14:
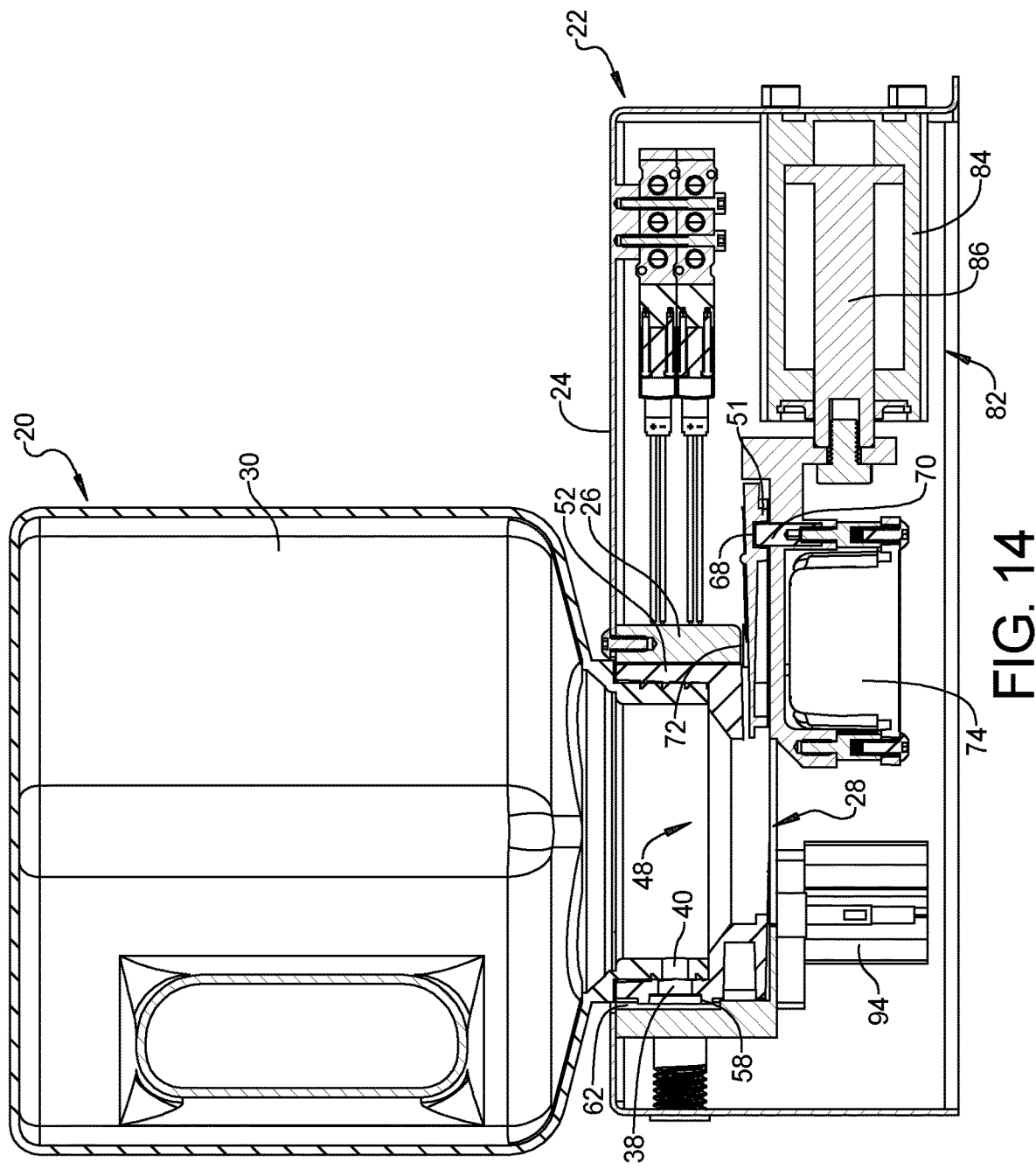
FIG. 14 is a cross-section view showing the bulk rivet container of FIG. 1 and part of the transfer cabinet example of FIG. 1 with the actuator, container cover, and cabinet cover in respective open positions.
Figure 15:
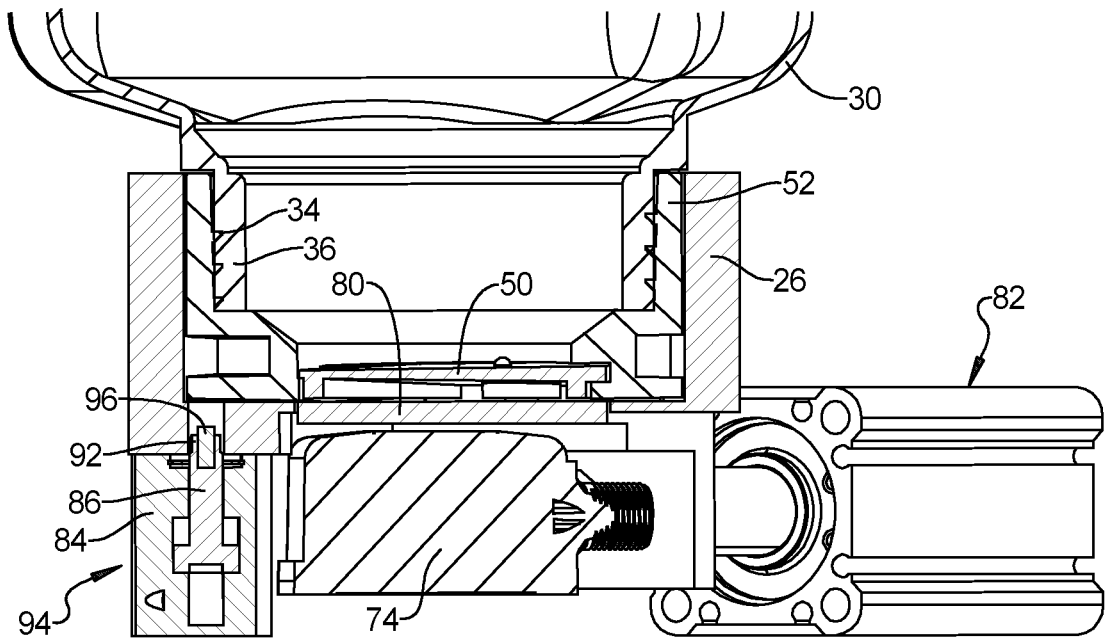
FIG. 15 is a cross-section view showing the container bumping protrusion of the transfer cabinet example of FIG. 1 in a non-bumping position relative to the bulk rivet container example of FIG. 1.

Example embodiments will now be described more fully with reference to the accompanying drawings.

Referring to FIGS. 1-15 one example of a bulk rivet container 20 designed to be used in combination with one example of a transfer cabinet 22 in accordance with the present disclosure is illustrated. The container 20 houses the rivets 21 in bulk (i.e., loose) within the container. The rivets can be self-piercing rivets 21. The transfer cabinet 22 can include a housing 24, including a mounting receptacle 26 for coupling the container 20 to the cabinet. The housing 24 and the mounting receptacle 26 can be positioned over a rivet entry passage 28 of the cabinet 22. The transfer cabinet 22 can receive the bulk rivets 21 from the container 20 and feed them sequentially (i.e., one after another) to a rivet feeder 23, such as a pneumatic feeder, of a riveting machine 25.

The container 20 can include a container body 30 and a container cap 32. The container cap 32 and the container body 30 (e.g., on the neck 36) can include cooperating threads 34 for rotationally or threadably coupling the cap 32 onto the body 30. The cap 32 and the body 30 can include cooperating apertures 38 and 40, respectively, which can be aligned with each other when the cap 32 is coupled to the container body 30. A pin 42 and grommet 44 can be positioned through the cooperating apertures 38 and 40 to prevent rotational uncoupling of the cap 32 from the container body 30. Thus, the cooperating apertures 38 and 40 and the pin 42 and grommet 44 are examples of anti-cap removal components of an anti-cap removal assembly. Other examples, of cooperating anti-cap removal components include an anti-cap removal lug or tooth engaged with a cooperating anti-cap removal lug or tooth. The anti-cap removal lug or tooth, or the cooperating anti-cap removal lug or tooth, or both can be a series of lugs or teeth.

Because the pin 42 and grommet 44 extending through the cooperating apertures 38, 40 resist rotational uncoupling of the cap 32 from the container body 30, it is difficult to open the container to remove and replace or otherwise alter the rivets in the container without removing the pin 42 and grommet 44 from the apertures 38, 40. Such pin 42 and grommet 42 removal is difficult in itself. In addition, a tamper evident seal or sticker 46 can be placed over the pin 42 and/or the grommet 44 to provide an indication that the container 20 may have been opened and the rivets 21 within the container 20 may have been replaced or otherwise altered.

The bulk rivets 21 can be discharged from the container through a container discharge passage 48. Portions of the container discharge passage 48 of the container 20 can be defined by the neck 36 of the container body 30 and by the container cap 32. A container cover 50 can be movable between a closed container position (for example, FIG. 11) in which the container cover 50 closes the container discharge passage 48 to prevent the rivets from being discharged from the container 20 through this passage 48 and an open container position (for example, FIG. 14) in which the container cover 50 opens the container discharge passage 48 to allow the rivets 21 to be discharged from the container 20 through this passage 48.

As in the illustrated example, the container cover 50 can be a portion of the cap 32 or movably coupled thereto. The container cover 50 can be slidable relative to a threaded, stationary, or body 52 portion of the cap 32. For example, opposite peripheral edges of the cover 50 can be slidably received within opposing grooves of the cap body 52. The cap body 52 of the container cap 32 can include an end wall 54 and a peripheral side wall 56 extending from the end wall 54. Thus, the peripheral side wall 56 of the cap 32 and similar peripheral side walls of the container body 30 can each define part of the peripheral side of the container 20. The container discharge passage 48 can extend through the end wall of the cap 32.

An anti-cover opening protrusion 76 can be provided along the container cover 50. As in this embodiment, the anti-cover opening protrusion 76 can extend interiorly from the container cover 50 and can engage against an adjacent anti-cover opening wall or surface 78 of the cap 32 of the container 20 to resist direct manual movement of the container cover 50 from the closed container position (for example, FIG. 11) to the open container position (for example, FIG. 14). In contrast, snap-locks and similar arrangements that hold a cover closed until the cover is moved by direct manual action are not engaged with each other to resist direct manual movement of the cover because they are designed to do just the opposite, to allow direct manual movement of the cover. In some cases, the anti-cover opening protrusion 76 and anti-cover opening wall or surface 78 can be designed to engage with each other to resist movement from the closed position into the open position with sufficient force that a tool would be required (e.g., indirect manual action) to apply the necessary force to the container cover 50. The anti-cover opening protrusion 76 and anti-cover opening wall or surface 78 are one example of cooperating anti-cover opening components 76, 78, which can further increase the difficulty of opening the container 20 to remove and replace or otherwise alter the rivets 21 in the container 20.

The container 20 can include an orienting protrusion 58 provided along a peripheral side of the container 20 adjacent the discharge passage 48. As in this embodiment, the orienting protrusion 58 can extend radially outwardly from the peripheral side of the container 20, and the peripheral side of the container 20 can be an adjacent portion of the peripheral side wall 56 of the container cap 32. As in the illustrated example, the orienting protrusion 58 can include the raised annular protrusion or rib 60, portions of the pin 42 and the grommet 44, and combinations thereof extending radially outwardly from the peripheral side wall 56 of the container cap 32. The container orienting protrusion 58 can be designed to mate with a cooperating orienting recess 62 when the container 20 is mounted or coupled to the mounting receptacle 26 of the transfer cabinet 22. Such mating of the container orienting protrusion 58 and orienting recess 62 properly orients or positions various features of the container 20 with cooperating or corresponding features of the cabinet 22 when the container 20 is mounted or coupled to the mounting receptacle 26 of the cabinet 22 as discussed hereinafter. Thus, the container 20 can only be properly or fully mounted or coupled to the mounting receptacle 26 in a single orientation or position.

The container 20 can include a container locking recess 64 designed to receive or couple with a cooperating container locking protrusion 66 to lock the container 20 to the transfer cabinet 22 when the container 20 is mounted or coupled to the mounting receptacle 26 of the cabinet 22. The container locking recess 64 can be provided along a peripheral side of the container 20 adjacent the discharge passage 48. As in this example, the container locking recess 64 can extend radially inwardly from a peripheral side of the container 20, and the peripheral side of the container 20 can be an adjacent portion of the peripheral side wall 56 of the container cap 32.

The container 20 can include a container opening recess 68 along an exterior of the container cover 50 designed to receive or couple with a cooperating container opening protrusion 70 when the container 20 is mounted to the mounting receptacle 26 of the cabinet 22. The container opening recess 68 can be provided in an exterior of the container cover 50, such as within or behind a raised portion 51 of the container cover 50. The raised portion of the container can be an exteriorly extending protrusion 51 that can be an annular protrusion or rib 51. The container cover 50 can be a single-piece component including the container opening recess 68.

The container 20 can include a RFID tag 72 adjacent the container cover 50. For example, the RFID tag 72 can be coupled to an inner or interior surface of the container cover 50. Thus, in some cases, the RFID tag 72 can be provided within the interior of the container 20, so it is not accessible from outside the container 20 without opening the container 20. The positioning of the RFID tag 72 can be designed to be readable by an RFID reader 74 of the transfer cabinet 22 when the container 20 is mounted or coupled to the mounting receptacle 26 of the cabinet 22.

The transfer cabinet 22 can be designed to receive bulk (i.e., loose) rivets 21 from the rivet discharge passage 48 of the container 20 through a rivet entry passage 28 of the cabinet 22 and to feed the rivets 21 sequentially (i.e., one after another) to a rivet feeder 23, such as a pneumatic feeder, of a riveting machine 25. The housing 24 and the mounting receptacle 26 can extend above the cabinet entry passage 28. The cabinet 22 can include a cabinet cover 80 that can be movable between a closed cabinet position (for example, FIG. 11) and an open cabinet position (for example, FIG. 14). In the closed cabinet position, the cabinet cover 80 closes the cabinet entry passage 28 to prevent rivets 21 from passing therethrough. In the open position, the cabinet cover 80 opens the cabinet entry passage 28 to allow rivets 21 to pass therethrough.

The cabinet cover 80 can be coupled to a cover actuator 82. The cover actuator 82 and other actuators of the transfer cabinet 22 can include an actuator body 84 and an actuator arm 86. Examples of actuators of the cabinet 22 can include a pneumatic cylinder, a hydraulic cylinder, and a solenoid. Actuation of the cover actuator 82 can move the arm 86 linearly between extended and retracted positions relative to the actuator body 84. Movement of the actuator arm 86 between the extended and retracted positions can cause corresponding linear or sliding movement of the cabinet cover 80 between its closed and open positions. An exterior of the cabinet cover 80 can have a container opening protrusion 70 that engages or couples with the container opening recess 68 of the container cover 50. Thus, the cover actuator 82 can carry the container opening protrusion 70.

The transfer cabinet 22 can include a container presence sensor 106, and which can extend into the mounting receptacle 26. When the container 20 is mounted into the mounting receptacle 26, the container presence sensor 106 detects the presence of the container 20 properly or fully mounted therein. The container presence sensor 26 can comprise a switch that moves from a non-present position (FIG. 10) to a container present position (e.g., FIG. 9) when the container 20 is properly or fully mounted therein.

The transfer cabinet 22 can include a container locking protrusion 66 adjacent the cabinet entry passage 28 and movable between an unlocked position and a locked position. The container locking protrusion can be provided by an actuator arm 86 of a locking actuator 88. In the locked position, the locking protrusion 66 of the cabinet 22 extends into the locking recess 90 of the container 20. Thus, the container 20 is prevented from being removed from the mounting receptacle of the cabinet 22. In the unlocked position, the locking protrusion 66 of the cabinet 22 is retracted outside of the container locking recess 64. Thus, the container can be removed from the mounting receptacle 26 of the cabinet 22.

The transfer cabinet 22 can include an RFID reader 74. The RFID reader 74 can be positioned adjacent the mounting receptacle 26 of the cabinet 22. For example, the RFID reader 74 can be coupled to an interior side of the cabinet cover 80.

The transfer cabinet 22 can include a container orienting recess 62 that simultaneously orients various features of the container 20 relative to various corresponding features of the cabinet 22 when the container 20 is mounted to the mounting receptacle 26 of the cabinet 22. When this occurs, the orienting protrusion 58 of the container 20 is received in or coupled to the orienting recess 62 of the mounting receptacle 26 of the cabinet 22. The orienting protrusion 58 and recess 62 can be a single orienting protrusion 58 and recess 62. The container 20 can be mountable or coupleable to the cabinet 22 in only one orientation.

When the container 20 is mounted to the transfer cabinet 22 with the orienting protrusion 58 and recess 62 engaged with, received in, or coupled to each other, the RFID tag 72 can be positioned to be read by the RFID reader 74. Simultaneously, the container locking protrusion 66 can be positioned in alignment with, or adjacent to the container locking recess 64 where movement of the container locking protrusion 66 from the unlocked position to the locked position locks or latches the container to the cabinet 22. Simultaneously, the container opening protrusion 70 of the cabinet cover 80 of the cabinet 22 can be aligned with, engaged with, received in, or coupled to the container opening recess 68 of the container cover 50 of the container 20 enabling the container cover 50 to move from the closed container position to the open container position as the cabinet cover 80 moves from the closed cabinet position to the open cabinet position.

Thus, the container's 22 orienting protrusion 58, locking recess 64 and opening recess 68, can be designed to be simultaneously couplable with the cabinet's orienting recess 62, locking protrusion 66, and opening protrusion 70, respectively. Positioning of the RFID tag 72 relative to the RFID reader 74 can be designed to make the RFID tag 72 additionally simultaneously readable by the RFID reader 74. The RFID reader 74, the cover actuator 82, the locking actuator 88 can each be coupled to a controller 98. The controller 98 can include a circuit 100 that prevents operation of the cover actuator 82 unless a correct RFID tag 72 is being read by the RFID reader 74. The circuit 100 of the controller 98 can include a microprocessor 102 programmed to accomplish this and memory 104.

Figure 16:
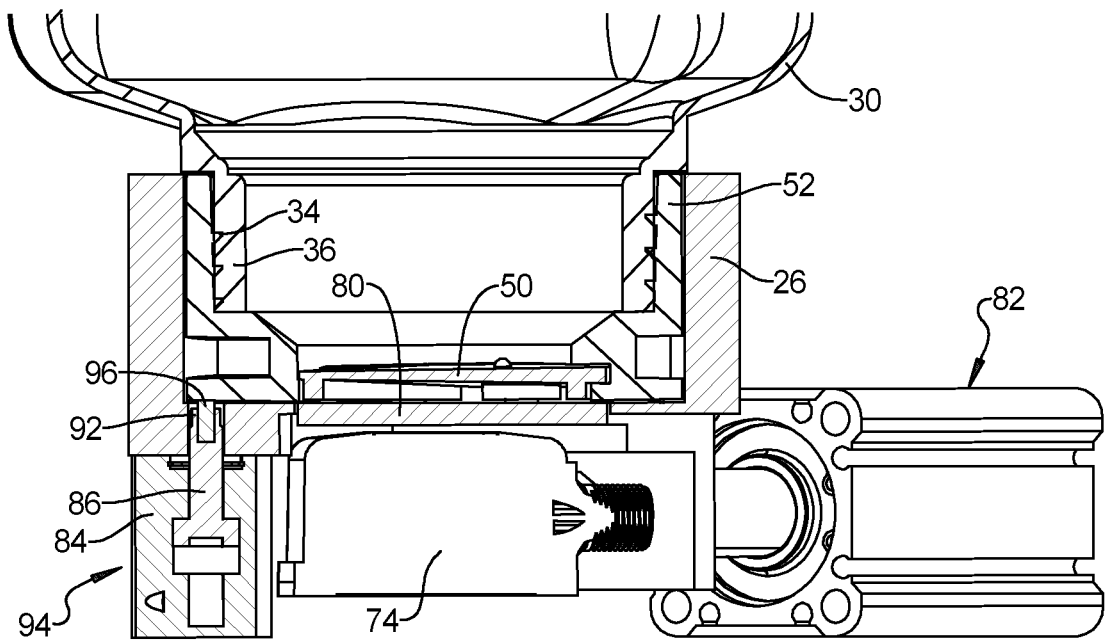
FIG. 16 is a cross-section view showing the container bumping protrusion of the transfer cabinet example of FIG. 1 in a bumping position relative to the bulk rivet container example of FIG. 1.

The transfer cabinet 22 can include a container bumping protrusion 92. The container bumping protrusion 92 can be provided by an actuator arm 86 of a bump actuator 94. The bumping protrusion 92 can include a bumper 96 of rubber or other material at a distal end of the actuator arm 86 of the bump actuator 94. In a bumping position (for example, FIG. 16), the actuator arm 86 of the bump actuator 94 can be extended relative to the actuator body 84, causing the bumping protrusion to contact or bump the container 20 when the container 20 is mounted or coupled to the cabinet 22. In a non-bumping position (for example, FIG. 15), the actuator arm 86 of the bump actuator 94 can be retracted toward the actuator body 84 and away from the container 20. Thus, reciprocating the container bumping protrusion 92 between the bumping and non-bumping positions can shake the container 20 to help insure all rivets 21 are dispensed from the container 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bulk rivet container designed to cooperate with a transfer cabinet having a cabinet entry passage closable by a cabinet cover to which an RFID reader is coupled and the transfer cabinet having a container locking protrusion and a container opening protrusion oriented about the cabinet entry passage relative to an orienting recess, the bulk rivet; container comprising:
    a container discharge passage through which bulk rivets are dischargeable from the container;
    a container cover moveable between a closed container position in which the container cover closes the container discharge passage, and an open container position in which the container cover opens the container discharge passage;
    an orienting protrusion provided along a peripheral side of the container adjacent the discharge passage;
    a container locking recess provided along the peripheral side of the container adjacent the container discharge passage;
    a container opening recess along an exterior of the container cover; and
    an RFID tag adjacent the container cover;
    wherein the orienting protrusion, the container locking recess, and the container opening recess are designed to be simultaneously couplable with the orienting recess, the container locking protrusion, and the container opening protrusion, respectively, and positioning of the RFID tag is designed to make the RFID tag simultaneously readable by the RFID reader.

2. The bulk rivet container of claim 1, wherein the container includes a container cap coupled to a container body, and the container cap includes the container cover slidably coupled to a cap body to provide slidable movement of the container cover relative to the cap body between the closed container position and the open container position.

3. The bulk rivet container of claim 2, wherein the cap body includes an anti-cover opening component, and the container cover includes a cooperating anti-cover opening component that engages the anti-cover opening component of the cap body to resist direct manual movement of the container cover from the closed container position to the open container position.

4. The bulk rivet container of claim 3, wherein the anti-cover opening component of the cap body is a first of a protrusion and a stop wall, and the cooperating anti-cover opening component of the container cover is a second of the protrusion and the stop wall.

5. The bulk rivet container of claim 3, wherein the anti-cover opening component of the cap body is a stop wall, and the cooperating anti-cover opening component of the container cover is an interiorly extending protrusion.

6. The bulk rivet container of claim 1, wherein the container includes a container cap coupled to a container body, and the peripheral side of the container corresponds to a peripheral side of the container cap.

7. The bulk rivet container of claim 6, wherein the orienting protrusion extends radially outwardly from the peripheral side of the container cap.

8. The bulk rivet container of claim 7, wherein the container locking recess extends radially inwardly from the peripheral side of the container cap.

9. The bulk rivet container of claim 1, wherein the container includes a container cap coupled to a container body, the container body includes an anti-cap removal component, and the container cap includes a cooperating anti-cap removal component that engages the anti-cap removal component of the container body to prevent removal of the cap from the container body.

10. The bulk rivet container of claim 9, wherein the container cap is threadably coupled to the container body.

11. The bulk rivet container of claim 10, wherein each of the anti-cap removal component of the container body and the cooperating anti-cap removal component of the container cap include apertures aligned with each other.

12. The bulk rivet container of claim 11, wherein the anti-cap removal component of the container body and the cooperating anti-cap removal component of the container cap include a pin and grommet extending through the apertures.

13. The bulk rivet container of claim 1, wherein the container includes a container cap coupled to a container body with a pin and grommet extending through aligned apertures of the container cap and container body, respectively.

14. The bulk rivet container of claim 13, wherein a tamper evident sticker extends over the pin and grommet.

15. The bulk rivet container of claim 1, wherein the exterior of the container cover comprises an exteriorly extending protrusion and the container opening recess is provided within or behind the exteriorly extending protrusion.

16. The bulk rivet container of claim 1, wherein the bulk rivet container houses self-piercing rivets.

17. The bulk rivet container of claim 1, wherein the RFID tag is coupled to an interior side of the container cover.

18. The bulk rivet container of claim 1, wherein the container includes a container cap coupled to a container body, wherein the container body includes an anti-cap removal component and the container cap includes a cooperating anti-cap removal component that engages the anti-cap removal component of the container body to prevent removal of the cap from the container body, and wherein the container cap includes the container cover slidably coupled to a cap body to provide slidable movement of the container cover relative to the cap body between the closed container position and the open container position, and wherein the cap body includes an anti-cover opening component, and the container cover includes a cooperating anti-cover opening component that engages the anti-cap removal component of the cap body to resist direct manual movement of the container cover from the closed container position to the open container position.

19. A bulk rivet container and transfer cabinet combination, comprising:
the transfer cabinet including:
a cabinet entry passage through which bulk rivets are receivable into the cabinet from the container;
a container mounting receptacle positioned over the cabinet entry passage and including a container orienting recess in a periphery thereof;
a cabinet cover movable between a closed cabinet position in which the cabinet cover closes the cabinet entry passage and an open cabinet position in which the cabinet cover opens the cabinet entry passage, and an exterior of the cabinet cover having a container opening protrusion;
a container locking protrusion adjacent the container mounting receptacle and movable between an unlocked position and a locked position; and
an RFID reader coupled to the cabinet cover; and
the bulk rivet container including:
a container discharge passage through which bulk rivets are dischargeable from the container into the cabinet;
a container cover moveable between a closed container position in which the container cover closes the container discharge passage, and an open container position in which the container cover opens the container discharge passage;
a container orienting protrusion along a peripheral side of the container adjacent the container discharge passage;
a container locking recess along the peripheral side of the container adjacent the container discharge passage;
a container opening recess along an exterior of the container cover;
an RFID tag adjacent the container cover;
wherein, when the container is mounted to the container mounting receptacle of the cabinet, the RFID tag is positioned to be readable by the RFID reader, the container orienting protrusion is engaged with the container orienting recess, the container locking protrusion is movable between the unlocked position in which the container locking protrusion is outside the container locking recess and the locked position in which the container locking protrusion is engaged with the container locking recess, and the container opening protrusion is engaged with the container opening recess enabling the container cover to move from the closed container position to the open container position as the cabinet cover moves from the closed cabinet position to the open cabinet position.

20. The bulk rivet container and transfer cabinet combination of claim 19, wherein the transfer cabinet includes a cover actuator carrying the container opening protrusion, and wherein the transfer cabinet includes a lock actuator carrying the cabinet cover and container locking protrusion; and wherein the transfer cabinet includes a bump actuator carrying a bumper; and wherein reciprocating actuation of the bump actuator reciprocates the bumper against the container when the container is mounted to the container mounting receptacle of the cabinet.

\* \* \* \* \*